United States Patent
Ikeyama et al.

(10) Patent No.: US 9,508,971 B2
(45) Date of Patent: *Nov. 29, 2016

(54) GAS-PERMEABLE FILTER PROVIDED WITH OIL REPELLENCY

(75) Inventors: Yoshiki Ikeyama, Osaka (JP); Nobuaki Maruoka, Osaka (JP); Naofumi Kosaka, Osaka (JP); Asuka Onohara, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 251 days.

This patent is subject to a terminal disclaimer.

(21) Appl. No.: 14/001,813

(22) PCT Filed: Feb. 24, 2012

(86) PCT No.: PCT/JP2012/001289
§ 371 (c)(1),
(2), (4) Date: Oct. 3, 2013

(87) PCT Pub. No.: WO2012/117709
PCT Pub. Date: Sep. 7, 2012

(65) Prior Publication Data
US 2014/0023895 A1 Jan. 23, 2014

(30) Foreign Application Priority Data

Feb. 28, 2011 (JP) .................... 2011-042794
Apr. 25, 2011 (JP) .................... 2011-097649

(51) Int. Cl.
| | | |
|---|---|---|
| *H01M 2/12* | (2006.01) | |
| *B01D 67/00* | (2006.01) | |
| *B01D 69/02* | (2006.01) | |
| *B01D 71/36* | (2006.01) | |
| *B01D 39/16* | (2006.01) | |
| *C08F 220/36* | (2006.01) | |
| *C08J 7/04* | (2006.01) | |

(52) U.S. Cl.
CPC ........ *H01M 2/1264* (2013.01); *B01D 39/1692* (2013.01); *B01D 67/0093* (2013.01); *B01D 69/02* (2013.01); *B01D 71/36* (2013.01); *C08F 220/36* (2013.01); *C08J 7/047* (2013.01); *B01D 2239/0421* (2013.01); *B01D 2239/0478* (2013.01); *B01D 2325/04* (2013.01); *B01D 2325/20* (2013.01); *C08J 2327/18* (2013.01); *C08J 2433/16* (2013.01)

(58) Field of Classification Search
CPC .................. B01D 2239/0478; B01D 2325/04; B01D 2325/20; B01D 39/1692; B01D 69/02; B01D 71/36; B01D 2239/0421; B01D 37/0093; H01M 2/1264; C08J 7/047; C08F 220/36

USPC .......................................................... 429/82
See application file for complete search history.

(56) References Cited

U.S. PATENT DOCUMENTS

| | | |
|---|---|---|
| 3,236,672 A | 2/1966 | Shane et al. |
| 3,256,230 A | 6/1966 | Johnson et al. |
| 3,256,231 A | 6/1966 | Johnson et al. |
| 3,419,602 A | 12/1968 | Pittmann et al. |
| 3,524,760 A | 8/1970 | Pinkerton |
| 3,585,169 A | 6/1971 | Domba |
| 3,637,791 A | 1/1972 | Pittman |
| 3,823,171 A | 7/1974 | Pittman |
| 4,768,857 A | 9/1988 | Sakunaga et al. |
| 5,021,501 A | 6/1991 | Ohmori et al. |
| 5,021,527 A | 6/1991 | Ohmori et al. |
| 5,156,780 A | 10/1992 | Kenigsberg et al. |
| 5,346,949 A | 9/1994 | Fukazawa |
| 5,462,586 A | 10/1995 | Sugiyama et al. |
| 5,584,997 A | 12/1996 | Yagihashi et al. |
| 5,630,846 A | 5/1997 | Hara et al. |
| 5,804,074 A | 9/1998 | Takiguchi et al. |
| 5,879,794 A | 3/1999 | Korleski |
| 6,228,477 B1 | 5/2001 | Klare et al. |
| 6,302,934 B1 * | 10/2001 | Nabata et al. .................. 55/486 |
| 6,723,147 B2 | 4/2004 | Mashiko et al. |
| 6,890,436 B2 | 5/2005 | Komatsu et al. |
| 6,939,580 B2 | 9/2005 | Enomoto et al. |

(Continued)

FOREIGN PATENT DOCUMENTS

| | | |
|---|---|---|
| CN | 101896572 | 11/2010 |
| EP | 2 683 176 | 1/2014 |

(Continued)

OTHER PUBLICATIONS

English translation of JP2009-242679A, Kashiwagi, Oct. 2009, Japan.*

*Primary Examiner* — Jonathan Jelsma
*Assistant Examiner* — Rashid Alam
(74) *Attorney, Agent, or Firm* — Hamre, Schumann, Mueller & Larson, P.C.

(57) ABSTRACT

A gas-permeable filter provided with oil repellency is provided. The gas-permeable filter includes a porous membrane having a surface coated with an oil-repellent agent. The oil-repellent agent includes a linear fluorine-containing hydrocarbon group represented by —$R^1C_5F_{10}CH_2C_4F_9$ or —$R^2C_6F_{13}$, and the porous membrane is a stretched polytetrafluoroethylene (PTFE) porous membrane. Here, $R^1$ and $R^2$ are each independently an alkylene group having 1 to 12 carbon atoms or a phenylene group. The gas-permeable filter is provided with oil repellency without significant reduction in gas permeability.

6 Claims, No Drawings

(56) References Cited

U.S. PATENT DOCUMENTS

| | | |
|---|---|---|
| 6,994,621 B2 | 2/2006 | Mashiko et al. |
| 7,199,197 B2 | 4/2007 | Caldwell et al. |
| 7,277,153 B2 | 10/2007 | Iida et al. |
| 7,678,155 B2 | 3/2010 | Yamaoto et al. |
| 7,758,656 B2 | 7/2010 | Enomoto et al. |
| 7,954,944 B2 | 6/2011 | Abe et al. |
| 8,079,574 B2 | 12/2011 | Lin |
| 8,338,529 B2 | 12/2012 | Hoshino et al. |
| 8,512,428 B2 | 8/2013 | Ueki et al. |
| 8,524,644 B2 | 9/2013 | Kawata et al. |
| 8,680,223 B2 | 3/2014 | Jin et al. |
| 8,747,521 B2 | 6/2014 | Sano |
| 9,005,334 B2 | 4/2015 | Furuyama et al. |
| 9,044,706 B2 | 6/2015 | Furuyama et al. |
| 2003/0068459 A1 | 4/2003 | Yializis |
| 2003/0106161 A1 | 6/2003 | Enomoto et al. |
| 2004/0122464 A1 | 6/2004 | Wang et al. |
| 2005/0001974 A1 | 1/2005 | Iida et al. |
| 2005/0175811 A1 | 8/2005 | Kubota et al. |
| 2008/0081772 A1 | 4/2008 | Kawata |
| 2008/0274920 A1 | 11/2008 | Negoro et al. |
| 2008/0309717 A1 | 12/2008 | Nakamoto |
| 2009/0084498 A1 | 4/2009 | Shimizu |
| 2009/0143262 A1 | 6/2009 | Kawata |
| 2009/0169896 A1 | 7/2009 | Sohn et al. |
| 2009/0188857 A1 | 7/2009 | Moore |
| 2010/0143641 A1 | 6/2010 | Yamamoto et al. |
| 2010/0224817 A1 | 9/2010 | Jin et al. |
| 2010/0316835 A1 | 12/2010 | Nakamura et al. |
| 2011/0020591 A1 | 1/2011 | Nakamura et al. |
| 2011/0021099 A1 | 1/2011 | Nakamura et al. |
| 2011/0028059 A1 | 2/2011 | Nakamura et al. |
| 2011/0230623 A1 | 9/2011 | Hirano et al. |
| 2012/0171495 A1 | 7/2012 | Masuda et al. |
| 2012/0247647 A1 | 10/2012 | Moriyama et al. |
| 2012/0285645 A1 | 11/2012 | Kusumi et al. |
| 2012/0325419 A1 | 12/2012 | Uehara et al. |
| 2013/0005928 A1 | 1/2013 | Hoshino et al. |
| 2013/0014642 A1 | 1/2013 | Sano |
| 2013/0074691 A1 | 3/2013 | Furuyama et al. |
| 2013/0087042 A1 | 4/2013 | Furuyama et al. |
| 2013/0283744 A1 | 10/2013 | Nakamura et al. |
| 2014/0023895 A1 | 1/2014 | Ikeyama et al. |
| 2014/0137739 A1 | 5/2014 | Ishii et al. |
| 2014/0260986 A1 | 9/2014 | Ishizuka et al. |
| 2015/0041127 A1 | 2/2015 | Kuki et al. |
| 2015/0089911 A1 | 4/2015 | Ikeyama |
| 2015/0096699 A1 | 4/2015 | Uehara et al. |
| 2015/0165386 A1 | 6/2015 | Mori et al. |
| 2015/0166820 A1 | 6/2015 | Ikeyama et al. |

FOREIGN PATENT DOCUMENTS

| | | | |
|---|---|---|---|
| JP | 4-506982 | | 12/1992 |
| JP | 6-073229 | | 3/1994 |
| JP | 7-048464 | | 2/1995 |
| JP | 7-126428 | | 5/1995 |
| JP | 9-022935 | | 1/1997 |
| JP | 9-103662 | | 4/1997 |
| JP | 9-132667 | | 5/1997 |
| JP | 2004-237142 | | 8/2004 |
| JP | 2005-253711 | | 9/2005 |
| JP | 2009242679 A | * | 10/2009 |
| JP | 2011-171728 | | 9/2011 |
| JP | 2012-130885 | | 7/2012 |
| WO | 91/01791 | | 2/1991 |
| WO | 2008/041750 | | 4/2008 |
| WO | WO 2010/101091 | | 9/2010 |
| WO | 2011/158408 | | 12/2011 |
| WO | 2011/158409 | | 12/2011 |
| WO | 2012/086606 | | 6/2012 |
| WO | 2012/117709 | | 9/2012 |

* cited by examiner

GAS-PERMEABLE FILTER PROVIDED WITH OIL REPELLENCY

TECHNICAL FIELD

The present invention relates to a gas-permeable filter provided with oil repellency.

BACKGROUND ART

Vent holes are often provided in housings of various devices, as exemplified by: automobile electric components such as headlamps, rear lamps, fog lamps, turn lamps, motors, various pressure sensors, and pressure switches; cameras; videos; information terminals such as mobile phones; electric shavers; electric toothbrushes; and lamps for outdoor use. The main purpose of providing a vent hole in a housing of a device is to provide ventilation between the inside and outside of the device, and thus to avoid excessive increase in the internal pressure associated with the fact that the temperature inside the housing of the device is increased by operation of the device. Also, a vent hole is provided in a casing of a battery for the purpose of emitting a gas generated during operation of the battery.

In order to prevent entry of water or dust through a vent hole provided in a housing of a device, a gas-permeable filter is attached to the vent hole in some cases. A porous membrane made of a polyolefin resin or a fluorine resin is often used as a gas-permeable filter. In particular, a porous membrane formed by stretching polytetrafluoroethylene (hereinafter, referred to as "PTFE") and having a microporous structure is known as a gas-permeable filter excellent in water repellency. Depending on the usage environment, a gas-permeable filter may contact sebum, a surfactant, an oil, or the like. Even when a stretched PTFE porous membrane excellent in water repellency is used as a gas-permeable filter, entry of a liquid having a low surface tension cannot be fully prevented. Accordingly, depending on the intended use, a gas-permeable filter is subjected to oil-repellent treatment using a treating agent including a fluorine-containing polymer.

It is well-known that a fluorine-containing polymer having a linear perfluoroalkyl group (hereinafter, "linear perfluoroalkyl group" may be referred to as "Rf group") having eight or more carbon atoms is suitable for providing oil repellency. Rf groups having eight or more carbon atoms have a significantly higher crystallinity than Rf groups having a smaller number of (e.g., six or less) carbon atoms. The high crystallinity is considered to contribute to exerting excellent oil repellency. It is also known that, due to the high crystallinity, a treating agent having an Rf group having eight or more carbon atoms allows for a large receding contact angle (which is one of the dynamic contact angles, along with an advancing contact angle). The receding contact angle becomes larger with increasing crystallinity, and sharply increases as the number of carbon atoms changes from six to eight. For these reasons, usual methods for providing oil repellency to a gas-permeable filter use a treating agent including a fluorine-containing polymer having an Rf group having eight or more carbon atoms.

It is also known that oil repellency is provided to a gas-permeable filter using another treating agent together with the above treating agent. For example, JP H7(1995)-126428 A (Patent Literature 1) discloses treating a gas-permeable filter with a treating agent that includes a fluorine-containing polymer having an Rf group and that also includes a fluorine resin whose main chain has a fluorine-containing alicyclic structure (claim 1 etc.). The fluorine resin having a fluorine-containing alicyclic structure has properties excellent for film formation, and can be obtained, for example, by polymerization of perfluoro(2,2-dimethyl-1,3-dioxole) (paragraphs [0009] and [0011]). Patent Literature 1 teaches that the number of carbon atoms in the perfluoroalkyl group is 4 to 16, and particularly preferably 6 to 12 (paragraph [0023]). However, in the description of Examples, a fluorine-containing polymer having perfluoroalkyl groups having nine carbon atoms on average is used as in the usual methods describe above (paragraphs [0049] and [0050]; Examples).

CITATION LIST

Patent Literature

Patent Literature 1: JP H7(1995)-126428 A

SUMMARY OF INVENTION

Technical Problem

As described above, it has been conventionally thought that use of the high crystallinity of an Rf group having eight or more carbon atoms is essential to provide high oil repellency. For example, as indicated in the description of Examples in Patent Literature 1, sufficient oil repellency cannot be provided to a gas-permeable filter by using only a fluorine resin having a fluorine-containing alicyclic structure (Comparative Examples). Also in view of practical use, when a gas-permeable filter has such characteristics that the gas-permeable filter is "instantly wetted" by contact with toluene or IPA (isopropanol) used in the oil repellency test of Patent Literature 1, the oil repellency cannot be regarded as sufficient. The actual situation is that an Rf group having eight or more carbon atoms is used in order to provide practically sufficient oil repellency to a gas-permeable filter.

However, in some cases where oil-repellent treatment is performed using a treating agent including a fluorine-containing polymer having an Rf group having eight or more carbon atoms, the gas permeability of a gas-permeable filter is significantly reduced. The degree of reduction in the gas permeability depends on a porous structure of the gas-permeable filter. For example, in the case of a non-woven fabric made of polyolefin or nylon, the gas permeability is generally reduced only to a limited extent by oil-repellent treatment. On the other hand, in the case of a stretched PTFE porous membrane having a distinctive microporous structure composed of fibrils and nodes, the gas permeability may be remarkably reduced as a result of oil-repellent treatment using the above treating agent.

In view of the above circumstances, the present invention aims to provide oil repellency to a stretched PTFE porous membrane without significantly reducing the gas permeability.

Solution to Problem

The present invention provides a gas-permeable filter provided with oil repellency. The gas-permeable filter includes a porous membrane having a surface coated with an oil-repellent agent. The oil-repellent agent has a linear fluorine-containing hydrocarbon group represented by 1) —$R^1C_5F_{10}CH_2C_4F_9$ or 2) —$R^2C_6F_{13}$, and the porous membrane is a stretched PTFE porous membrane. Here, $R^1$ and $R^2$ are each independently an alkylene group having 1 to 12 carbon atoms or a phenylene group.

Advantageous Effects of Invention

The oil-repellent agent having a linear fluorine-containing hydrocarbon group represented by 1) or 2) can provide oil repellency enough to meet practical requirements, without significantly reducing the gas permeability of a stretched PTFE porous membrane. The present invention makes it possible to provide oil repellency to a stretched PTFE porous membrane without significantly reducing the gas permeability.

DESCRIPTION OF EMBODIMENTS

A gas-permeable filter according to the present invention includes a stretched PTFE porous membrane having a surface coated with an oil-repellent agent. An example of a method for producing the stretched PTFE porous membrane will be described below, although a commercially-available product may be used as the stretched PTFE porous membrane.

First, a liquid lubricant is added to a PTFE fine powder, and a paste-like mixture is preformed. The liquid lubricant is not particularly limited, and may be any liquid lubricant that can wet the surface of the PTFE fine powder and that can be removed by extraction or drying. For example, a hydrocarbon product such as liquid paraffin, naphtha, and white oil, can be used. The appropriate amount of the liquid lubricant added is about 5 parts by weight to 50 parts by weight per 100 parts by weight of the PTFE fine powder The preforming may be performed at such a pressure that the liquid lubricant is not squeezed out.

Next, the preformed body is formed into a sheet by paste extrusion or rolling, and the formed body of PTFE is uniaxially or biaxially stretched to obtain a stretched PTFE porous membrane. The stretching of the formed body of PTFE is preferably carried out after the liquid lubricant is removed.

In the present specification, as is conventional, a PTFE porous membrane formed by stretching the formed sheet of PTFE and having a microporous structure is referred to as a "stretched PTFE porous membrane". The stretched PTFE porous membrane typically has a distinctive microporous structure composed of fibrils and nodes, and exhibits excellent water repellency by itself.

The stretched PTFE porous membrane may be a sintered product obtained by sintering performed at a temperature higher than or equal to the melting point of PTFE, or may be an unsintered product that has not undergone the sintering.

The average pore diameter of the stretched PTFE porous membrane is preferably 0.005 μm to 10 μm, more preferably 0.01 μm to 5 μm, and particularly preferably 0.1 μm to 3 μm. When the average pore diameter is too small, the gas permeability of the gas-permeable filter may be reduced. When the average pore diameter is too large, leak of foreign matters may occur. In addition, the thickness of the stretched PTFE porous membrane is preferably 5 μm to 5000 μm, more preferably 10 μm to 1000 μm, and particularly preferably 10 μm to 500 μm. When the thickness of the membrane is too small, there is a risk that the strength of the membrane is insufficient or the gas-permeable filter is deformed to a very large degree due to a differential pressure between the inside and the outside of a gas-permeable housing. When the thickness of the membrane is too large, the gas permeability of the gas-permeable filter may be reduced.

The gas-permeable filter may be a layered body including: a stretched PTFE porous membrane having a surface coated with an oil-repellent agent; and a gas-permeable support for reinforcing the membrane. The use of the gas-permeable support can prevent the gas-permeable filter from deforming due to a differential pressure. The gas-permeable support may be a single-layer body or a layered body formed of two or more layers. In order for oil repellency to be exerted, at least one principal surface of the gas-permeable filter should be constituted by the surface of the stretched PTFE porous membrane that is coated with the oil-repellent agent.

As the gas-permeable support, an ultrahigh molecular weight polyethylene porous membrane, a non-woven fabric, a woven fabric, a net, a mesh, a sponge, a foam, a metallic porous membrane, a metallic mesh, or the like, can be used. From the standpoint of, for example, strength, elasticity, gas permeability, workability, and adhesion to containers, a non-woven fabric or an ultrahigh molecular weight polyethylene porous membrane is preferable as the gas-permeable support.

The stretched PTFE porous membrane and the gas-permeable support may be simply stacked together, may be adhered together using an adhesive, a hot-melt resin or the like, or may be welded together by hot welding, ultrasonic welding, vibration welding or the like.

The present invention uses an oil-repellent agent having a linear fluorine-containing hydrocarbon group represented by:

   1)

   2)

Here, $R^1$ and $R^2$ are each independently a phenylene group or an alkylene group having 1 to 12 carbon atoms or preferably 1 to 10 carbons atoms. The fluorine-containing hydrocarbon group represented by 1) or 2) is a linear fluoroalkyl group when $R^1$ or $R^2$ is an alkylene group. The term "linear" is intended to make it clear that the carbon skeleton of the fluorine-containing hydrocarbon group does not have two or more branched terminals, and is not intended to exclude the case where a phenylene group is contained as $R^1$ or $R^2$.

A linear perfluoroalkyl group (Rf group) is a functional group that has $CF_3$ group exhibiting a low surface free energy and that provides water/oil repellency to a coated surface. As described above, it is known that an Rf group having eight or more carbon atoms has high crystallinity, and thus allows excellent oil repellency to be exerted. A treating agent including a fluorine-containing polymer having an Rf group having eight or more carbon atoms is suitable for providing water/oil repellency to a substrate made of leather, paper, resin or the like. However, when the treating agent is used for a gas-permeable filter having a microporous structure, such as a stretched PTFE porous membrane, the gas permeability may be significantly reduced. The water/oil repellency provided by the treating agent is useful particularly for uses that require large dynamic contact angles. However, it is generally sufficient that a gas-permeable filter can be provided with oil repellency enough to block penetration of hydrocarbons such as toluene and decane, and of lower alcohols as typified by IPA. When a surface of the stretched PTFE porous membrane is coated with the oil-repellent agent having the linear fluorine-containing hydrocarbon group represented by 1) or 2), practically sufficient oil repellency can be provided to the stretched PTFE porous membrane without significant reduction in the gas permeability.

The oil-repellent agent is preferably a fluorine-containing polymer having a linear fluorine-containing hydrocarbon group as a side chain. In the fluorine-containing polymer, for example, the linear fluorine-containing hydrocarbon group is bonded to the main chain directly or via a functional group such as an ester group and an ether group.

Examples of the fluorine-containing polymer having a linear fluorine-containing hydrocarbon group represented by 1) or 2) include a polymer formed from monomers at least part of which is a compound represented by:

$$CH_2=CR^3COOR^1C_5F_{10}CH_2C_4F_9; \text{ or} \qquad \text{a)}$$

$$CH_2=CR^4COOR^2C_6F_{13}. \qquad \text{b)}$$

Here, $R^1$ and $R^2$ are as described above. In addition, $R^3$ and $R^4$ are each independently a hydrogen atom or a methyl group.

In the case where high oil repellency is required, a compound represented by a), or a compound represented by b) where $R^4$ is a methyl group, is preferably selected as a monomer. That is, a preferred embodiment of the present invention uses a polymer formed from a monomer that is a compound represented by:

$$CH_2=CR^3COOR^1C_5F_{10}CH_2C_4F_9; \text{ or} \qquad \text{a)}$$

$$CH_2=C(CH_3)COOR^2C_6F_{13}. \qquad \text{b')}$$

Also here, $R^1$, $R^2$, and $R^3$ are as described above.

The fluorine-containing polymer may be formed by polymerizing only the compound represented by a) and/or b) as a monomer, but may be formed by copolymerizing the compound with another monomer. Examples of the other monomer for copolymerization include various (meth) acrylic monomers. However, the other monomer is not limited to (meth)acrylic monomers. Any of various monomers having ethylenically unsaturated bonds, such as tetrafluoroethylene, may be used. The copolymer may be a random copolymer or a block copolymer. When the fluorine-containing polymer is a copolymer, the proportion of the compound represented by a) and/or b) in all monomers is preferably 60 mol % or more, and particularly preferably 90 mol % or more. The polymerization of the compound can be performed according to a commonly-known method for polymerizing an acrylic monomer, and can be carried out by solution polymerization or emulsion polymerization.

The average molecular weight of the fluorine-containing polymer is not particularly limited, and is, for example, about 1000 to 500000 in terms of the number average molecular weight.

Examples of the method for coating a surface of the stretched PTFE porous membrane with the oil-repellent agent include a method in which the gas-permeable filter is soaked into a solution prepared by dissolving the oil-repellent agent in a solvent, and a method in which the solution is applied or sprayed onto the gas-permeable filter. When coating the stretched PTFE porous membrane with the oil-repellent agent, it is preferable to fix the edges of the stretched PTFE porous membrane by a frame or the like in order to prevent contraction of the stretched PTFE porous membrane. The appropriate concentration of the oil-repellent agent in the solvent varies depending on the method for coating, and is about 0.1% by weight to 10% by weight in the case of the method in which the gas-permeable filter is soaked into the solvent.

When the gas permeability of the gas-permeable filter having been subjected to oil-repellent treatment is too low, the pressure difference between the inside and the outside of a gas-permeable housing cannot be eliminated quickly. The gas permeability is preferably 35 seconds/100 ml or lower in terms of Gurley number (the lower the Gurley number is, the higher the gas permeability is). As shown in Examples described below, the present invention can provide a gas-permeable filter that has a gas permeability of 35 seconds/100 ml or lower in terms of Gurley number and that has a surface having practical oil repellency. The surface has such a degree of oil repellency that a 5 mm-diameter droplet of an organic solvent that is n-decane or methanol does not penetrate the surface within 30 seconds after the droplet is applied onto the surface. The present invention can also provide a gas-permeable filter that includes a stretched PTFE porous membrane having a thickness of 5 μm or more or even 10 μm or more in order to achieve the strength required for the gas-permeable filter, and that also has a low Gurley number as described above and a surface having practical oil repellency.

EXAMPLES

Hereinafter, the present invention will be described in detail with reference to Examples and Comparative Examples. However, the present invention is not limited to these Examples.

Example 1

"TEMISH (registered trade mark) NTF 1131" manufactured by Nitto Denko Corporation (size: 15 cm×15 cm; thickness: 0.1 mm; average pore diameter: 1 μm) was prepared as a stretched PTFE porous membrane. In addition, an oil-repellent treatment liquid was prepared by diluting a water/oil-repellent agent, "X-70-041" manufactured by Shin-Etsu Chemical Co., Ltd., with a diluting agent ("FS thinner" manufactured by Shin-Etsu Chemical Co., Ltd.) so that the concentration of the water/oil-repellent agent was 3.0% by weight. The "X-70-041" is a water/oil-repellent agent whose oil-repellent component is a polymer including a monomer unit derived from a compound having a linear fluoroalkyl group and represented by the following formula (a-1).

$$CH_2=CHCOOCH_2CH_2C_5F_{10}CH_2C_4F_9 \qquad \text{(a-1)}$$

The periphery of the membrane was fixed in a frame having a size of 20 cm×20 cm so as to prevent contraction of the membrane, and the stretched PTFE porous membrane was soaked for about 3 seconds in the oil-repellent treatment liquid whose temperature was maintained at 20° C. Subsequently, the stretched PTFE porous membrane was left at ordinary temperature for about 1 hour to dry the stretched PTFE porous membrane. Thus, an oil-repellent gas-permeable filter was obtained.

Example 2

A gas-permeable filter was obtained in the same manner as in Example 1, except that a water/oil-repellent agent, "X-70-042" manufactured by Shin-Etsu Chemical Co., Ltd., was used. The "X-70-042" is a water/oil-repellent agent whose oil-repellent component is a polymer formed from a monomer that is a compound having a linear fluoroalkyl group and represented by the following formula (a-2).

$$CH_2=C(CH_3)COOCH_2CH_2C_5F_{10}CH_2C_4F_9 \qquad \text{(a-2)}$$

Example 3

An amount of 100 g of a compound having a linear fluoroalkyl group and represented by the formula (b-1) shown below, 0.1 g of azobisisobutyronitrile acting as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. An oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=CHCOOCH_2CH_2C_6F_{13} \quad \text{(b-1)}$$

A gas-permeable filter was obtained in the same manner as in Example 1, except that the oil-repellent treatment liquid was used.

Example 4

An amount of 100 g of a compound having a linear fluoroalkyl group and represented by the formula (b-2) shown below, 0.1 g of azobisisobutyronitrile acting as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. An oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=C(CH_3)COOCH_2CH_2C_6F_{13} \quad \text{(b-2)}$$
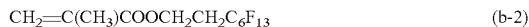

A gas-permeable filter was obtained in the same manner as in Example 1, except that the oil-repellent treatment liquid was used.

Comparative Example 1

An amount of 100 g of a compound having a linear fluoroalkyl group and represented by the formula (c) shown below, 0.1 g of azobisisobutyronitrile acting as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. An oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=C(CH_3)COOCH_2CH_2C_8F_{17} \quad \text{(c)}$$
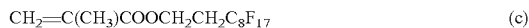

A gas-permeable filter was obtained in the same manner as in Example 1, except that the oil-repellent treatment liquid was used.

Gas permeability test and oil repellency test were carried out for the obtained gas-permeable filters having been subjected to oil-repellent treatment, and for the aforementioned stretched PTFE porous membrane not having been treated (untreated product). The gas permeability test was carried out by Gurley test method specified in JIS P 8117. The oil repellency test was carried out in accordance with "Textiles-Oil repellency-Hydrocarbon resistance test" specified in ISO 14419. Specifically, a droplet of an organic solvent having a diameter of about 5 mm was applied onto a surface of each gas-permeable filter using a pipette, and whether or not penetration of the droplet occurred within 30 seconds after application of the droplet was visually confirmed. As the organic solvent, n-decane, methanol, and n-hexane were used. For penetration of the droplet, it was determined that "penetration occurred" when the droplet was absorbed into the porous membrane or when the color of the porous membrane changed due to penetration of the droplet. The results are shown in Table 1.

TABLE 1

| | Oil repellency test | | | Gurley number |
|---|---|---|---|---|
| | n-decane | methanol | n-hexane | (seconds/100 ml) |
| Untreated product | x | x | x | 8 |
| Example 1 | o | o | o | 18 |
| Example 2 | o | o | o | 20 |
| Example 3 | o | o | x | 13 |
| Example 4 | o | o | o | 13 |
| Comparative Example 1 | o | o | o | 41 | o: Penetration did not occur
x: Penetration occurred

In Comparative Example 1, the Gurley number was increased more than five-fold, compared to the untreated product. Although the high crystallinity of a linear perfluoroalkyl group (Rf group) having eight or more carbon atoms is advantageous in exerting oil repellency, the high crystallinity constitutes an obstacle to maintaining the gas permeability of a microporous structure as formed in the stretched PTFE porous membrane. On the other hand, in Examples 1 to 4, the Gurley number was increased only about 1.6-fold to 2.5-fold, compared to the untreated product. When Examples 1 to 4 and Comparative Example are compared, the Gurley number of Comparative Example is more than twice those of Examples 1 to 4.

Furthermore, in any of Examples 1 to 4, a surface having oil repellency enough to block penetration of n-decane (surface tension: 23.83 dyn·cm$^{-1}$) and methanol (surface tension: 22.45 dyn·cm$^{-1}$) was obtained. Such a surface that blocks penetration of these organic solvents can meet practical requirements for the characteristics needed for use as a gas-permeable filter.

Patent Literature 1 discloses examples (Comparative Examples 3 and 4) where a fluorine resin having a fluorine-containing alicyclic structure, which was an oil-repellent agent having no linear perfluoroalkyl group having eight or more carbon atoms, was used to treat a stretched PTFE porous membrane. Each of the surfaces treated in these examples of Patent Literature 1 only had such a degree of oil repellency that the surface was "instantly wetted" by toluene having a higher surface tension (28.52 dyn·cm$^{-1}$) than n-decane and by isopropanol (IPA) having the same degree of surface tension (21.32 dyn·cm$^{-1}$) as methanol. By comparison with these examples, it can be understood that an oil-repellent agent having a linear fluorine-containing hydrocarbon group represented by 1) —R$^1$C$_5$F$_{10}$CH$_2$C$_4$F$_9$ or 2) —R$^2$C$_6$F$_{13}$ is especially excellent as an oil-repellent agent for providing oil repellency to a stretched PTFE porous membrane without significantly reducing the gas permeability of the stretched PTFE porous membrane.

In Examples 1, 2, and 4, it was confirmed that penetration of n-hexane having a surface tension lower than 20 dyn·cm$^{-1}$ (surface tension: 18.40 dyn·cm$^{-1}$) was blocked. It can be understood that a) CH$_2$=CR$^3$COOR$^1$C$_5$F$_{10}$CH$_2$C$_4$F$_9$ or b') CH$_2$=C(CH$_3$)COOR$^2$C$_6$F$_{13}$ is particularly excellent as a monomer for forming an oil-repellent agent.

The invention claimed is:

1. A gas-permeable filter provided with oil repellency, the gas-permeable filter comprising a porous membrane having a surface coated with an oil-repellent agent, wherein
the porous membrane is a stretched polytetrafluoroethylene porous membrane, and
the oil-repellent agent comprises a linear fluorine-containing hydrocarbon group represented by —R$^1$C$_5$F$_{10}$CH$_2$C$_4$F$_9$, where R$^1$ is an alkylene group having from 1 to 12 carbon atoms or a phenylene group.

2. The gas-permeable filter according to claim 1, wherein
the gas-permeable filter has a gas permeability of 35 seconds/100 ml or lower in terms of Gurley number, and
a 5 mm-diameter droplet of an organic solvent that is n-decane or methanol does not penetrate the surface within 30 seconds after the droplet is applied onto the surface.

3. The gas-permeable filter according to claim 2, wherein the stretched polytetrafluoroethylene porous membrane has a thickness of 5 μm or more.

4. The gas-permeable filter according to claim 1, wherein the oil-repellent agent is a polymer formed from monomers at least part of which is a compound represented by:
CH$_2$=CR$^3$COOR$^1$C$_5$F$_{10}$CH$_2$C$_4$F$_9$,
where R$^3$ is a hydrogen atom or a methyl group.

5. The gas-permeable filter according to claim 4, wherein the oil-repellent agent is a polymer formed from a monomer that consists of the compound represented by:
CH$_2$=CR$^3$COOR$^1$C$_5$F$_{10}$CH$_2$C$_4$F$_9$.

6. The gas-permeable filter according to claim 5, wherein a 5 mm-diameter droplet of an organic solvent that is n-hexane does not penetrate the surface within 30 seconds after the droplet is applied onto the surface.

* * * * *